(12) United States Patent
Fieglein et al.

(10) Patent No.: US 11,302,136 B2
(45) Date of Patent: *Apr. 12, 2022

(54) METHODS, SYSTEMS, AND DEVICES FOR SECURE PAYMENT AND PROVIDING MULTIMEDIA AT FUEL DISPENSERS

(71) Applicant: Wayne Fueling Systems LLC, Austin, TX (US)

(72) Inventors: Henry Fieglein, Leander, TX (US); Steve Belt, Pflugerville, TX (US)

(73) Assignee: Wayne Fueling Systems LLC, Austin, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 17/077,428

(22) Filed: Oct. 22, 2020

(65) Prior Publication Data

US 2021/0049857 A1 Feb. 18, 2021

Related U.S. Application Data

(63) Continuation of application No. 16/600,040, filed on Oct. 11, 2019, now Pat. No. 10,846,976, which is a
(Continued)

(51) Int. Cl.
*G07F 15/00* (2006.01)
*G06Q 20/10* (2012.01)
(Continued)

(52) U.S. Cl.
CPC .......... *G07F 15/001* (2013.01); *G06F 21/31* (2013.01); *G06F 21/84* (2013.01); *G06Q 20/102* (2013.01);
(Continued)

(58) Field of Classification Search
CPC ............................. G07F 15/001; G06F 21/31
(Continued)

(56) References Cited

U.S. PATENT DOCUMENTS 7,940,255 B2 5/2011 Ichimura
10,445,971 B2 10/2019 Fieglein et al.
(Continued)

FOREIGN PATENT DOCUMENTS

KR 20080033600 A 4/2008
KR 100913962 B1 8/2009
(Continued)

OTHER PUBLICATIONS

European Office Action for EP Application No. 17835180.5 dated Mar. 29, 2021.
(Continued)

*Primary Examiner* — Allyson N Trail
(74) *Attorney, Agent, or Firm* — Mintz Levin Cohn Ferris Glovsky and Popeo, PC; Lisa Adams

(57) ABSTRACT

Methods, systems, and devices for secure payment and providing multimedia at fuel dispensers are provided. In general, a fuel dispenser can include a terminal configured to receive secure information and to show multimedia. The terminal can be configured to switch between a first mode and a second mode. The terminal can include a touchscreen. In the first mode, the touchscreen can have a shield enabled thereon that is configured to reduce a field of view of the touchscreen such that the touchscreen is only visible from specific angle(s). In the second mode, the shield can be disabled such that the touchscreen does not have a reduced field of view.

22 Claims, 7 Drawing Sheets

Related U.S. Application Data continuation of application No. 15/220,938, filed on Jul. 27, 2016, now Pat. No. 10,445,971.

(51) Int. Cl.
| | | |
|---|---|---|
| *G06F 21/31* | (2013.01) | |
| *G06F 21/84* | (2013.01) | |
| *G06Q 20/18* | (2012.01) | |
| *G07F 13/02* | (2006.01) | |
| *G06Q 20/12* | (2012.01) | |
| *G07F 9/02* | (2006.01) | |

(52) U.S. Cl.
CPC ........... *G06Q 20/123* (2013.01); *G06Q 20/18* (2013.01); *G07F 9/0235* (2020.05); *G07F 13/025* (2013.01); *G06F 2221/2105* (2013.01)

(58) Field of Classification Search
USPC ........................................ 235/492
See application file for complete search history.

(56) References Cited

U.S. PATENT DOCUMENTS

| | | | |
|---|---|---|---|
| 10,846,976 | B2 | 11/2020 | Fieglein et al. |
| 2004/0193910 | A1 | 9/2004 | Moles |
| 2006/0016884 | A1 | 1/2006 | Block et al. |
| 2006/0044290 | A1 | 3/2006 | Hurwitz et al. |
| 2007/0030240 | A1 | 2/2007 | Sumiyoshi et al. |
| 2007/0033398 | A1 | 2/2007 | Robertson et al. |
| 2008/0144179 | A1 | 6/2008 | Mimura et al. |
| 2008/0278675 | A1 | 11/2008 | Escuti et al. |
| 2009/0265638 | A1 | 10/2009 | Carapelli et al. |
| 2013/0300985 | A1 | 11/2013 | Bulda |
| 2014/0289133 | A1 | 9/2014 | Weston et al. |
| 2015/0121082 | A1 | 4/2015 | Carapelli et al. |
| 2016/0098709 | A1 | 4/2016 | Johnson et al. |
| 2016/0364729 | A1* | 12/2016 | Ruparelia .......... G06Q 20/3278 |
| 2017/0329773 | A1 | 11/2017 | Fieglein et al. |
| 2020/0043275 | A1 | 2/2020 | Fieglein et al. |

FOREIGN PATENT DOCUMENTS

| | | |
|---|---|---|
| KR | 20140040299 A | 4/2014 |
| WO | WO-2015185083 A1 | 12/2015 |
| WO | WO-2016010989 A1 | 1/2016 |

OTHER PUBLICATIONS

U.S. Appl. No. 15/220,938, U.S. Pat. No. 10,445,971, filed Jul. 27, 2016, Henry Fieglein et al.
U.S. Appl. No. 16/600,040, filed Oct. 11, 2019, Henry Fieglein et al.
International Search Report and Written Opinion for Application No. PCT/US2017/043887 dated Sep. 21, 2017.
Extended European Search Report for EP Application No. 17835180.5 dated Dec. 11, 2019.

* cited by examiner

110

110

110

110

110

110

METHODS, SYSTEMS, AND DEVICES FOR SECURE PAYMENT AND PROVIDING MULTIMEDIA AT FUEL DISPENSERS

CROSS REFERENCE TO RELATED APPLICATIONS

This application is a continuation of U.S. patent application Ser. No. 16/600,040 filed on Oct. 11, 2019 entitled "METHODS, SYSTEMS, AND DEVICES FOR SECURE PAYMENT AND PROVIDING MULTIMEDIA AT FUEL DISPENSERS," which is a continuation of U.S. patent application Ser. No. 15/220,938 (now U.S. Pat. No. 10,445,971) filed on Jul. 27, 2016 entitled "METHODS, SYSTEMS, AND DEVICES FOR SECURE PAYMENT AND PROVIDING MULTIMEDIA AT FUEL DISPENSERS," which are hereby incorporated by reference in their entities.

FIELD

The present disclosure relates generally to methods, systems, and devices for secure payment and providing multimedia at fuel dispensers.

BACKGROUND

The retail petroleum industry utilizes various types of payment terminals for dispensing fuel to customers. In order to process customer payments, payment terminals can request personally identifiable information (PII) from the customer. In addition to processing payment for dispensing fuel, payment terminals can provide additional functions such as playing multimedia including advertisements and sale offers or other promotions to customers. Thus, although a customer may not want other people nearby to see the PII entered by the customer and certain security requirements may be legally required to ensure secure input of PII, the customer or the retailer may want to make the multimedia as visible as possible to the customer or others around. While some payment terminals use physical obstructions to protect the privacy of a customer (e.g., a hood over the payment terminal or the payment terminal being tilted or recessed), these physical obstructions also block the view of multimedia provided via the payment terminal from certain angles (e.g., the payment terminal can be at least partially obstructed when a customer is standing at the gas tank at the rear of a car or when the customer is removing a nozzle from the fuel dispenser). It is therefore difficult to provide the security needed for input of PII while also allowing for visibility of multimedia.

Accordingly, there remains a need for improved methods, systems, and devices for secure payment and providing multimedia at fuel dispensers.

SUMMARY

In general, methods, systems, and devices for secure payment and providing multimedia at fuel dispensers are provided.

In one aspect, an apparatus is provided that in one embodiment includes an electronic display configured to display content, a touchscreen operably coupled to the electronic display and configured to receive user input in response to the content, and an active display shield operably coupled to the electronic display and configured to switch between a first mode and a second mode. The active display shield obscures view of the content from a plurality of views in the first mode, and the active display shield does not obscure view of the content in the second mode.

The apparatus can vary in any number of ways. For example, the content can include a request for personally identifiable information (PII). The electronic display can also be configured to display multimedia, and the active display shield can be configured to be in the second mode when the multimedia is displayed and to be in the first mode when the content is displayed whether or not the multimedia is also displayed.

For another example, the active security shield can be positioned on top of the touchscreen, and the touchscreen can be positioned on top of the electronic display.

For yet another example, the active security shield can be configured to automatically switch between the first mode and the second mode in response to the user input. The user input can include secure information.

For still another example, the active security shield can be configured to switch to the first mode from the second mode in response to the content requesting PII as at least a portion of the user input. The active security shield can be configured to switch to the second mode from the first mode in response to the user input having been received.

For another example, the electronic display can be part of a fuel dispenser.

In another aspect, a fuel dispenser is provided that in one embodiment includes a memory storing instructions, and a processor operably coupled to the memory and configured to execute the instructions to display, via a graphical user interface (GUI), a request for personally identifiable information (PII) that is restricted to viewing from a first field of view of the GUI. The first field of view is less than an entire field of view of the GUI. The processor is also configured to execute the instructions to receive the PII via the GUI, and display, via the GUI, multimedia that is viewable from the entire field of view of the GUI.

The fuel dispenser can have any number of variations. For example, the PII can include one or more of a debit card personal identification number (PIN), a credit card PIN, an email address, a zip code, a phone number, name of a person, address, social security number, driver's license number, handwriting, credit card number, debit card number, date of birth, birthplace, login name, and password.

For another example, the GUI can be viewable from the entire field of view prior to the request for PII being displayed. The processor can be further configured to execute the instructions to automatically cause the GUI to switch from the GUI being viewable from the entire field of view to the GUI being viewable from the first field of view in response to the request for PII being displayed. The processor can be further configured to execute the instructions to automatically cause the GUI to switch from the GUI being viewable from the first field of view to the GUI being viewable from the entire field of view in response to the PII being received via the GUI.

For yet another example, the PII can be requested to process a payment for fuel, and the processor can be further configured to execute the instructions to prevent the fuel from being dispensed from the fuel dispenser until after the PII is received via the GUI.

In another aspect, a method is provided that in one embodiment includes determining that a prompt is to be displayed via a display of a device, determining whether the prompt is requesting input of secure information, determining whether an active security shield operable coupled to the display is active, disabling the active security shield in response to determining that the prompt is not requesting secure information and that the active security shield is active, and enabling the active security shield in response to determining that the prompt is requesting secure information and that the active security shield is inactive. The method also includes, after determining whether the active security shield is active, displaying the prompt via the display. The method also includes receiving user input responsive to the displayed prompt.

The method can vary in any number of ways. For example, the device can include a fuel dispenser. For another example, determining that the prompt is to be displayed can include determining whether a touch input to a touchscreen has been received. For yet another example, the secure information can include personally identifiable information (PII). For still another example, the active security shield can restrict a field of view of the display to less than an entire field of view of the display.

Non-transitory computer program products (e.g., physically embodied computer program products) are provided that store instructions, which when executed by one or more data processors of one or more computing systems, causes at least one data processor to perform operations herein. Similarly, computer systems are also provided that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

BRIEF DESCRIPTION OF DRAWINGS

This invention will be more fully understood from the following detailed description taken in conjunction with the accompanying drawings, in which.

DETAILED DESCRIPTION

Figure 1:
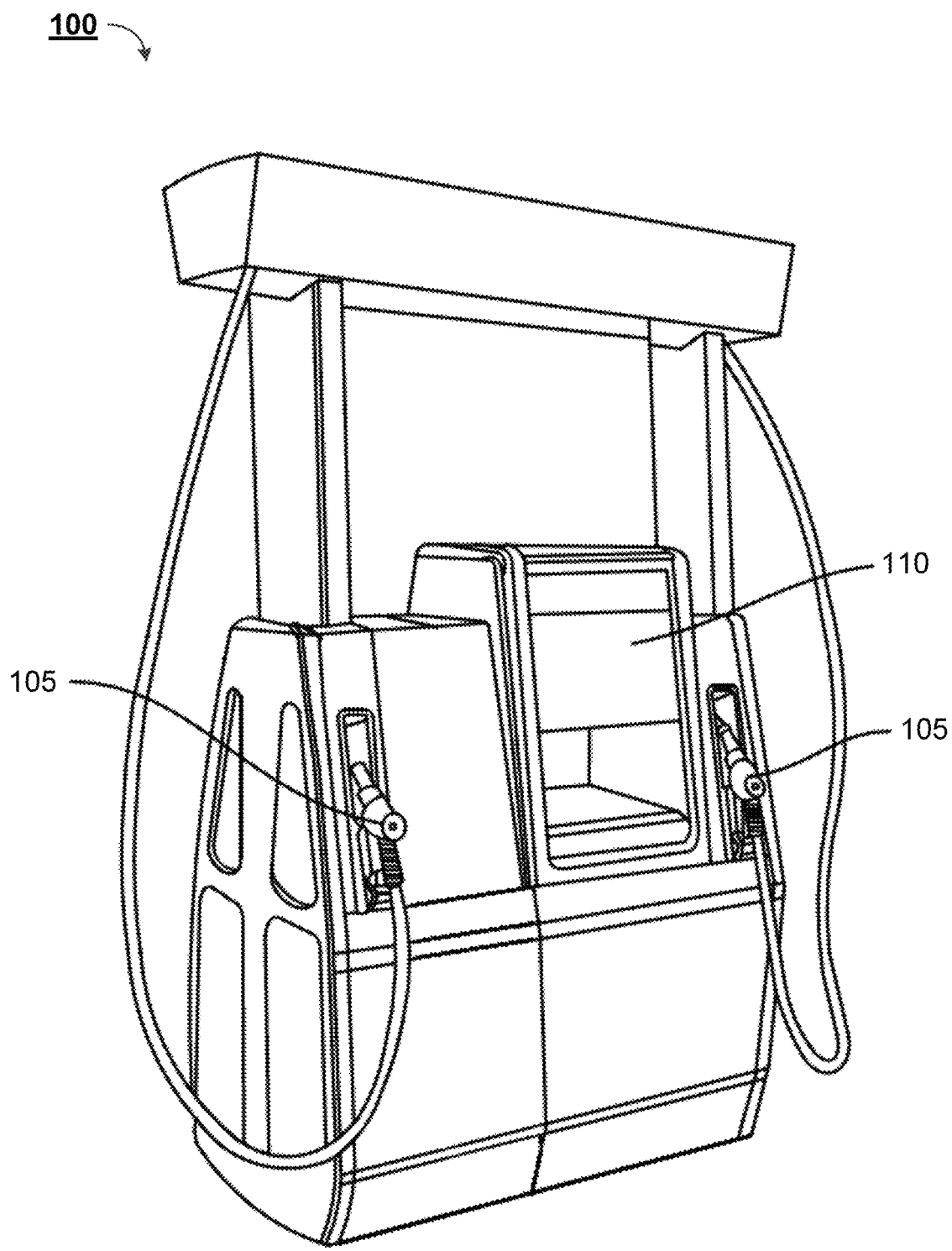
FIG. 1 is a schematic view of one embodiment of a fuel dispenser which includes a combined payment and multimedia terminal.

Certain exemplary embodiments will now be described to provide an overall understanding of the principles of the structure, function, manufacture, and use of the systems, devices, and methods disclosed herein. One or more examples of these embodiments are illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Further, in the present disclosure, like-named components of the embodiments generally have similar features, and thus within a particular embodiment each feature of each like-named component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape.

Methods, systems, and devices for secure payment and providing multimedia at fuel dispensers are provided. In general, a fuel dispenser can include a terminal configured to receive secure information (e.g., personally identifiable information (PII) that may potentially be used to personally identify a person, a password to gain access to an interior of the fuel dispenser or other device for maintenance and/or testing purposes, etc.) and configured to show multimedia. The terminal can be configured to switch between a first mode, in which the terminal has a first level of security and is configured to accept input of secure information, and a second mode, in which the terminal has a second level of security that is less secure than the first level of security and in which the terminal is configured to not accept input of secure information. Input of secure information may thus be securely protected since the secure information can only be input when the terminal is in the first mode, e.g., when the terminal is providing a higher level of security. The terminal can include a touchscreen configured to receive touch input thereto. In the first mode, the touchscreen can have a shield enabled thereon that is configured to reduce a field of view of the touchscreen such that the touchscreen is only visible from specific angle(s), e.g., a straight-on angle from which a customer using the touchscreen typically views the touchscreen. In the second mode, the shield can be disabled such that the touchscreen does not have a reduced field of view. Thus, multimedia provided by the terminal when the terminal is in the second mode may be visible from any point within the field of view, thereby maximizing visibility of the multimedia, while still allowing secure information to be input to the terminal when needed by having the terminal be in the first mode for such input.

The methods, systems, and devices for secure payment and providing multimedia described herein can be used at fuel dispensers or at any other device including a terminal configured to receive secure information and to show multimedia. For example, a vending machine can include a terminal configured to switch between first and second modes. A customer currently making a purchase from the vending machine may thus be able to securely input information to the terminal when the machine's terminal is in the first mode without other people standing or sitting near the machine being able to see the input, while multimedia on the terminal may be visible the customer and the other people when the terminal is in the second mode. For another example, a parking meter or other vehicle parking payment device can include a terminal configured to switch between first and second modes. A customer currently paying for parking at the device may thus be able to securely input information to the terminal when the device's terminal is in the first mode without other people standing or sitting near the device being able to see the input, while multimedia on the terminal may be visible the customer and the other people when the terminal is in the second mode. For yet another example, a taxi or other transportation service vehicle can include a terminal therein that is configured to switch between first and second modes. A customer currently paying for transportation may thus be able to securely input information to the terminal when the terminal is in the first mode without other people sitting in the vehicle being able to see the input, while multimedia on the terminal may be visible the customer and the other people when the terminal is in the second mode.

FIG. 1 is a schematic view of a fuel dispenser 100 that includes a payment and multimedia terminal 110. As illustrated, the fuel dispenser 100 includes four nozzles 105 configured to dispense fuel therefrom, but the dispenser 100 can include more or less nozzles in other embodiments. Two of the nozzles 105 are on the other side of the dispenser 100, obscured from view in FIG. 1. The other side of the dispenser 100 includes a second payment and multimedia terminal, also obscured from view in FIG. 1, that is configured and used similar to the payment and multimedia terminal 110. In other embodiments, the dispenser 100 can include another number of payment and multimedia terminals, such as a single terminal, two terminals mounted side by side to increase an overall display size, or a number of terminals equal to a number of the dispenser's nozzles. The fuel dispenser includes other components configured to facilitate payment for fuel and/or the dispensing of fuel, as will be appreciated by a person skilled in the art, such as a controller configured to control the terminal 110, a memory configured to store instructions executable by the controller, a communication unit configured to electronically communicate wired and/or wirelessly with devices external to the fuel dispenser 100 (e.g., mobile phones, remote servers, etc.), a pump configured to pump fuel from a fuel tank or other reservoir, hoses in communication with the pump and respective ones of the nozzles, nozzle boots that seat the nozzles 105 therein, a fuel meter configured to monitor fuel flow, valves, a vapor recovery system, etc.

In general, the terminal 110 is configured to receive secure information (e.g., PII, a password to gain access to an interior of the fuel dispenser or other device for maintenance and/or testing purposes, etc.) and configured to show multimedia. The terminal 110 is also configured to receive unsecure information, e.g., information that cannot be used to personally identify the customer, such as a selection of fuel grade, a selection to print a coupon for use in a store at a site of the fuel dispenser, a selection to display on the terminal 110 multimedia in the form of current weather information, etc. The terminal 110 can include various components to facilitate the input of information (secure and unsecure) thereto and the display of multimedia thereon, as discussed further below.

When a customer wishes to purchase fuel, the customer can utilize the terminal 110 to process the payment. In order to process payments, the terminal 110 can be configured to prompt the customer to provide personal information thereto, such as any one or more of a PIN number for authorizing a debit card transaction, a zip code for authorizing a credit card transaction, and a phone number for accessing rewards programs. As this information may potentially be used to personally identify the customer, at least on some level, this information is generally referred to as personally identifiable information (PII). Other forms of PII that the terminal 110 can be configured to prompt for input include name (or a portion thereof), address (or a portion thereof), email address, social security number (or a portion thereof, e.g., the last four digits), driver's license number, handwriting, credit card number, date of birth, birthplace, login name, password, or the like. Because this PII is sensitive, customers typically wish to prevent others from viewing or obtaining what they are inputting into the terminal 110 and/or government regulations applicable to the dispenser 100 may exist that require a certain level of security for input of PII to an electronic system.

The terminal 110 can include a card interface for the insertion of a credit/debit card, which may be chip-enabled and/or may include a magnetic strip with encoded credit/debit card information. The terminal 110 can include a physical display (e.g., a display screen) such as a cathode ray tube (CRT), a liquid crystal display (LCD), or a light emitting diode (LED) screen. In at least some embodiments, the terminal 110 can include one or more speakers configured to output audio therefrom, or the dispenser 100 can include the speaker(s) outside of the terminal 110.

The media (also referred to herein as "multimedia") that can be shown on the terminal 110 can include any one or more of various types of media. For example, the media can include advertisements for goods and/or services. The fuel dispenser 100 may thus output advertising content (e.g., notices of goods/services, coupons, "flash" deals, etc.) to users thereof, which may increase revenue for fueling site owners and/or other sellers. The goods can include any of a variety of types of goods, such as durable goods (e.g., vehicle parts, toys, etc.), perishable goods (e.g., food, drink, etc.), and intangible goods (e.g., software, digital media, etc.). The services can include any of a variety of types of services (e.g., oil changes, car washes, etc.). For another example, the media can include entertainment content, such as television content and music content. The fuel dispenser 100 may thus output entertainment to users thereof, which may improve user experience during fueling. For yet another example, the media can include geographic content such as maps and traffic conditions. The fuel dispenser 100 may thus output information geographically relevant to users of the fuel dispenser 100. For still another example, the media can include weather content. The fuel dispenser 100 may thus output information indicative of weather conditions relevant to users of the fuel dispenser 100.

The form of the media can be visual only (e.g., a still image, a silent video, etc.), audible only (e.g., music, a spoken message, etc.), or a combination of visual and audible (e.g., a video with sound, narrated still image, etc.). The media can be visually and/or audibly displayed and allow the user to access a coupon or other printable and/or electronically savable promotion for later use by the customer. For example, displayed media can include a message indicating that a coupon is available to a customer for a particular good or service that the customer may print for later use and/or access electronically for later use.

In at least some embodiments, the fuel dispenser 100 includes a media library (e.g., has the media library on board) such that the fuel dispenser 100 is configured to communicate directly with media source(s) and receive media content directly therefrom. The fuel dispenser 100 can thus be configured to be in control of its own media receipt schedule, to request media content from the media source(s) on demand, and to receive media content specific to the fuel dispenser 100. The fuel dispenser 100 can be originally manufactured to include the media library, or an existing fuel dispenser 100 can be retrofit to include the media library (e.g., can have the media library installed thereon and, if necessary, have a processor added thereto or have a current processor upgraded to handle processing related to the media library). Embodiments of media libraries are further described in U.S. patent application Ser. No. 15/153,966 entitled "Management Of Fuel Dispenser Media" filed on May 13, 2016, which is hereby incorporated by reference in its entirety.

Figure 2A:
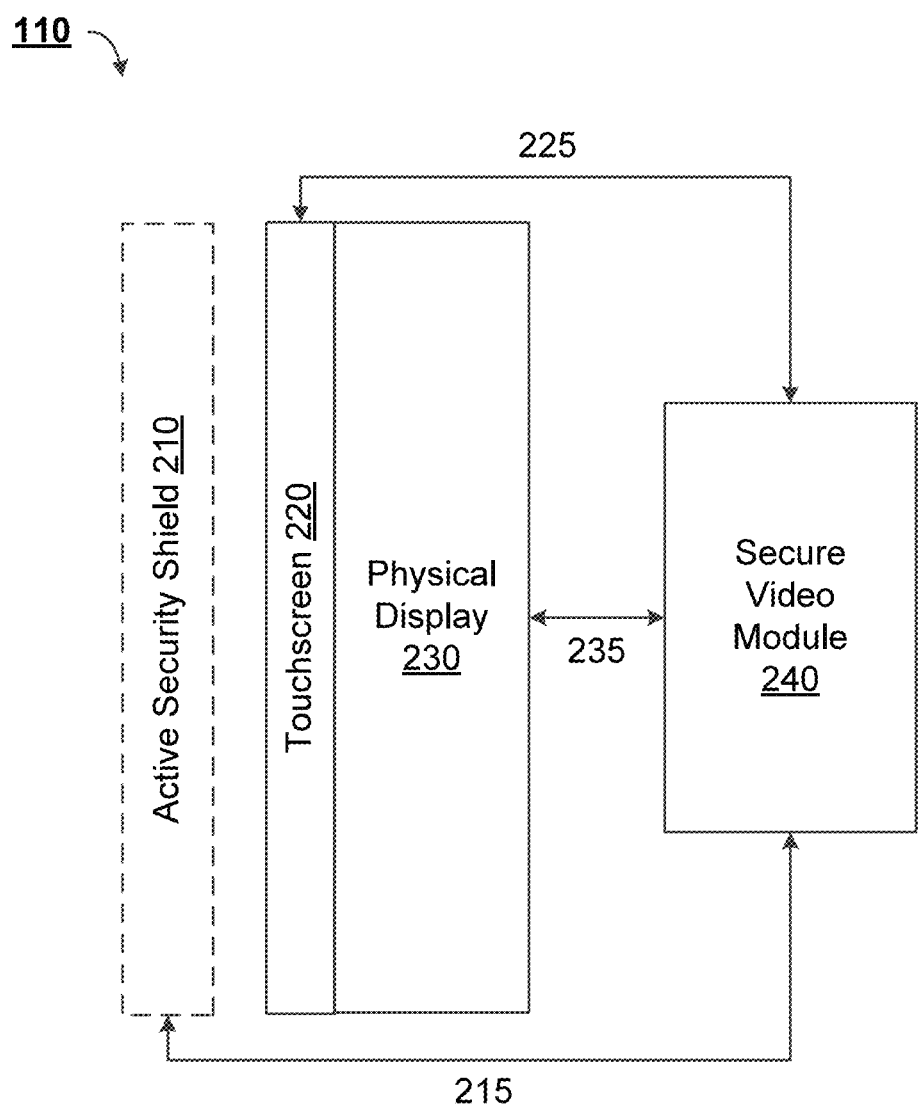
FIG. 2A is a schematic view of components of the terminal of FIG. 1.

FIG. 2A illustrates components of the terminal 110 of FIG. 1. As illustrated, the terminal 110 includes an active security shield 210, a touchscreen 220, and a physical display 230. The physical display 230 is configured to display information, display prompts for information, play/display media, and/or the like. The touchscreen 220, which is located on top of the physical display 230, e.g., facing outward therefrom so as to face toward a user, is configured to receive user input via detection of a physical touch of a surface of the touchscreen 220. Various methods for detecting a physical touch may be used, as will be appreciated by a person skilled in the art, such as capacitive, resistive, infrared (IR), optical, acoustic, or dispersive detection technologies.

The active security shield 210 is located on top the touchscreen 220 (and therefore on top of the physical display 230 as well). In other embodiments, the active security shield 210 can be positioned between the touchscreen 220 and the physical display 230 so as to be sandwiched therebetween. The terminal 110 is configured to operate in a first or active mode and a second or inactive mode each defined by the active security shield 210. In the inactive mode, the active security shield 210 allows for an unencumbered view of the physical display 230. In other words, the active security shield 210 does not restrict a field of view of the physical display 230 so as to not restrict a user's view of content displayed by the physical display 230. For example, if multimedia content or other information is clearly visible on the physical display 230 from zero to twenty feet away at angles between zero degrees (e.g., directly in front of the physical display 230) to seventy degrees on either side of the physical display 230, then the active security shield 210 in the inactive mode would not obstruct the multimedia content or other information at any of these distances or angles.

In the active mode, the active security shield 210 is configured to restrict the field of view of the physical display 230 so as to obscure a user's viewing of the physical display 230 from certain angles and/or certain distances. The field of view is not completely restricted in the active mode, thereby allowing for some visualization of the display 230 depending on a user's angle to and/or distance from the display 230. For example, using the example above, the active security shield 210 in the active mode can be configured to only allow for viewing of information on the physical display 230 from zero to three feet away and/or at angles between zero degrees to twenty degrees on either side. Thus, the active mode may prevent or otherwise reduce the visibility of the physical display 230 for anyone who is not the customer standing close to the terminal 110. Doing so may decrease the potential that the customer's PII is obtained by another person (either directly by eye or indirectly through a camera or other monitoring device targeted to the display 230), thereby increasing security and/or user confidence. The specific examples used herein are only for demonstration, as different distances, angles, and/or both distances and angles may be used to represent the field of view in the active and/or inactive modes.

In general, the active security shield 210 includes a filter that, when active, restricts the field of view of the display 230 and that, when inactive, does not restrict the field of view of the display 230 as if the shield 210 was not present in the system. In general, the filter includes material configured to be electrically modified between a first state (e.g., in the active mode), in which the filter restricts a field of view of the display 230 to which the filter is operably coupled, and a second state (e.g., in the inactive mode), in which the filter does not restrict the field of view of the display 230 to which the filter is operably coupled. Examples of such material include liquid crystal materials such as twisted nematic material liquid crystal material, super twisted nematic liquid crystal material, and polymer dispersed liquid crystal material.

The filter is configured to be driven by a control signal from the secure video module 240 that switches the filter on (e.g., in the active mode) and off (e.g., in the inactive mode). The secure video module 240 is configured to transmit the control signal to the active security shield 210 to turn the filter on (e.g., to electrically activate the material of the filter) in response to the secure video module 240 determining that that filter is not already on (e.g., by checking a current power state of the filter as stored in a memory of the terminal 110, by checking whether the most recent control signal previously transmitted to the filter was to turn the filter on or off, etc.) and determining that the display 230 is showing secure information thereon (e.g., by checking a library stored in a memory of the terminal 110 indicating whether any information on the screen is flagged as being secure, by checking whether a security flag stored in a memory of the terminal 110 is on (e.g., is a "1" binary value indicating that at least some information on the screen is secure instead of a "0" binary value indicating that no information on the screen is secure), etc.) or that the display 230 is showing a prompt to input secure information (e.g., by checking a library stored in a memory of the terminal 110 indicating whether any prompt on the screen is flagged as requesting secure information, by checking whether a security flag stored in a memory of the terminal 110 is on, etc.). The secure video module 240 is configured to transmit the control signal to the active security shield 210 to turn the filter off (e.g., to electrically deactivate the material of the filter) in response to the secure video module 240 determining that the filter is not already off, that the display 230 is not showing secure information thereon, and that the display 230 is not showing a prompt to input secure information. In at least some embodiments, the secure video module 240 can be configured to not determine a current power state of the filter (e.g., not determine whether the filter is currently on or off) in determining whether or not to transmit a control signal to the active security shield 210, which may help conserve processing resources and/or help ensure that the filter is in the desired on or off state since a control signal will be sent (depending on the secure information check) regardless of the filter's current state.

Embodiments of filters that can be used as the active security shield 210 (and as active security shields in other embodiments of terminals described herein) are further described in U.S. Pat. No. 7,940,255 entitled "Information Processing Device With Integrated Privacy Filter" issued on May 10, 2011, U.S. Patent Publication No. 2006/0044290 entitled "Electronic Privacy Filter" filed on Aug. 24, 2004, and U.S. Patent Publication No. 2013/0300985 entitled "Integrated Privacy Filter" filed on May 14, 2012, which are hereby incorporated by reference in their entireties.

As also shown in FIG. 2A, each of the active security shield 210, the touchscreen 220, and the physical display 230 in electronic communication with a secure video module 240 via one or more connections that can each be wired or wireless. The active security shield 210 is coupled to the secure video module 240 via a first connection 215, the touchscreen 220 is coupled to the secure video module 240 via a second connection 225, and the physical display 230 is coupled to the secure video module 240 via a third connection 235. One or more of the connections 215, 225, 235 can be implemented as a bus (e.g., a universal serial bus (USB)) connection, a low-voltage differential signaling (LVDS) connection, or the like). For example, the first and second connections 215, 225 can each be a USB connection, and the third connection 235 is an LVDS connection.

The secure video module 240 is configured to control operation of one or more of the active security shield 210, the touchscreen 220, and the physical display 230 based upon a current state, user input, or other information, as described herein. Based upon this control, the secure video module 240 is configured to provide for operation of the touchscreen 220 and/or an active privacy screen via the active security shield 210 that allow for secure prompting/receiving on the terminal 110 while also allowing for unencumbered media playback on the terminal 110. The secure video module 240 is illustrated as part of the terminal 110, but in other embodiments, the secure video module 240 can be included elsewhere in the fuel dispenser 100.

Although illustrated separately, one or more of the components of the terminal 110 can be combined or integrated with other components of the terminal 110. For example, the touchscreen 220 and the physical display 230 can be integrated to form a display screen with touchscreen capabilities. For another example, the active security shield 210 and the touchscreen 220 can be integrated.

Figure 2B:
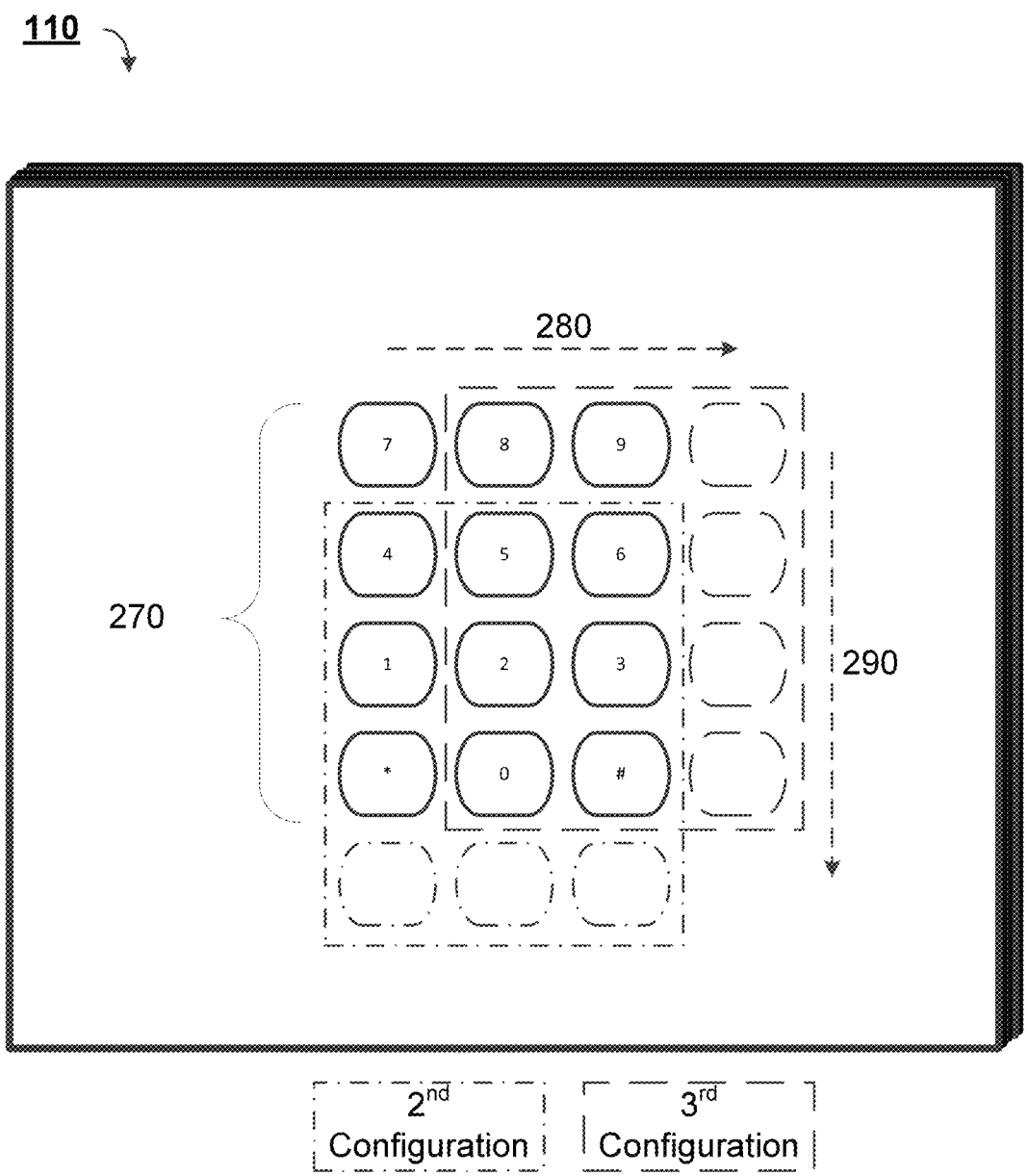
FIG. 2B is a front-facing schematic view of the terminal of FIG. 1.

FIG. 2B illustrates a front-facing view of the terminal 110 of FIG. 1, e.g., a view facing a user of the terminal 110. In addition to or alternative to the use of the active security shield 210 described herein, the terminal 110 can be configured to move input keys 270 along a vertical axis 290 and/or a horizontal axis 280 of the surface of the terminal 110. Thus, while most keypads are fixed in position (either physically or via software configuration), the terminal 110 may instead place a keypad in any of a number of different positions. For example, the input keys 270 are illustrated in a first configuration that is in a center of the terminal 110. However, all of the input keys 270 may be shifted along the vertical axis 290 to create a second configuration. Similarly, all of the input keys 270 may be shifted along the horizontal axis 280 to create a third configuration, or all of the input keys 270 may be shifted along the vertical and horizontal axes 290, 280 to create a fourth configuration. The actual position/configuration of the input keys 270 may vary over time and/or may be randomized. Moving the input keys 270 may provide additional security, as the actual position of the input keys 270 may be harder to predict, and recording devices (e.g., a still image camera, a video recording device, etc.) able to visually access the terminal 110 may be less likely to obtain PII. Although a simplified numeric touchscreen is illustrated, other combinations of input keys 270 can be utilized, such as a QWERTY keyboard for alphanumeric user input.

Figure 2C:
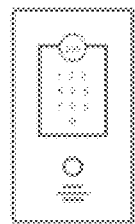
FIG. 2C is a schematic view of one embodiment of a customer verification screen.

FIG. 2B illustrates the terminal 110 showing input keys 270 thereon to which a user can provide input via touch. FIGS. 2C-2F illustrate other embodiments of information that can be shown on the terminal 110. FIG. 2C shows a customer verification screen requesting input of secure information thereto in the form of a PIN to verify the customer's identity. In addition to or instead of a PIN, the customer verification screen can request another type of verification, such an a pattern entry, an answer to a "secret" question previously answered by the customer, biometric authentication (e.g., fingerprint verification, eye pattern verification, palm print verification, DNA verification, hand geometry verification, vein pattern verification, etc.), NFC tap, etc. The customer verification screen includes a hint at the customer's recognized identification in the form of the customer's initials as identified through a customer's swipe of a credit/debit card, although other hints are possible, such as a full or partial user ID, display of an avatar image previously chosen by the customer, etc. If the PIN entered is the customer can be given more than one opportunity to input correct information before being refused.

Figure 2D:
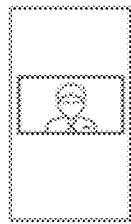
FIG. 2D is a schematic view of one embodiment of a help screen.

FIG. 2D shows a help screen configured to be shown in response to a user's request for help, e.g., by the user touching a "help" button. The help on the screen includes media in the form of a pre-recorded video message for demonstration of the feature for which the customer requested help. The video message can dismiss automatically after playing and the terminal 110 can return to the screen from which the help was requested.

Figure 2E:
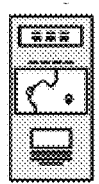
FIG. 2E is a schematic view of one embodiment of a fueling screen.

FIG. 2E shows a fueling screen configured to be shown during the dispensing of fuel from the dispenser 100. The fueling screen shows information related to the current fueling session while fuel is being dispensed from the fuel dispenser 100 and shows media in the form of current traffic information for a geographic location including the dispenser 100, although other types of media can be additionally or alternatively displayed as discussed herein.

Figure 2F:
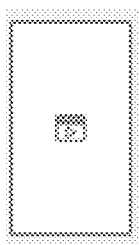
FIG. 2F is a schematic view of one embodiment of an idle screen.

FIG. 2F shows an idle screen that can be a default view on the display 230 shown when a fueling session is not active. The idle screen in this illustrated embodiment shows media in the form of a promotional video playing on a loop to facilitate sales and/or the fueling facility or company providing the fuel dispenser 100. The display is dimmed to save energy. No audio plays to improve customer experience of customers adjacent to the fuel dispenser 100 but not actively using the fuel dispenser 100, e.g., are using other fuel dispensers.

Figure 2G:
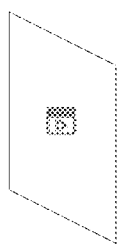
FIG. 2G is a schematic view of the idle screen of FIG. 2F viewed from a different angle.
Figure 2H:
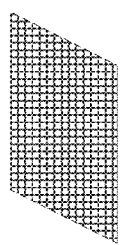
FIG. 2H is a schematic view of the customer verification screen of FIG. 2C viewed from a different angle with the information thereon obscured from view.

FIGS. 2C-2F show the various screens as viewed at a zero degree angle, e.g., directly in front of the display 230 showing the screens. The information displayed on the various screens is visible at this zero degree angle. FIG. 2G shows the idle screen of FIG. 2F as viewed from a non-zero angle. The information displayed on the idle screen is visible and is thus not being obscured by the active security shield 210. Since the active security shield 210 is inactive, the information displayed on the idle screen is visible from an entire field of view of the display 230. The help screen of FIG. 2D and the fueling screen 2E of FIG. 2E would be similarly unobscured when viewed at this non-zero angle (and any other angle within the entire field of view) since they are not showing or requesting input of secure information. FIG. 2H shows the customer verification screen of FIG. 2C viewed from the same non-zero angle as in FIG. 2G. The information displayed on the customer verification screen is not visible and is being obscured by the active security shield 210 since the customer verification screen is requesting input of secure information. The non-zero angle of FIGS. 2G and 2H is an example only, with the active security shield 210 also being able to restrict the field of view from other non-zero angles, such as from every non-zero angle such that the screen is only visible at the zero angle or from every non-zero angle except those within a predetermined threshold of zero (e.g., within +/− one degree, +/− two degrees, etc.).

Figure 3:
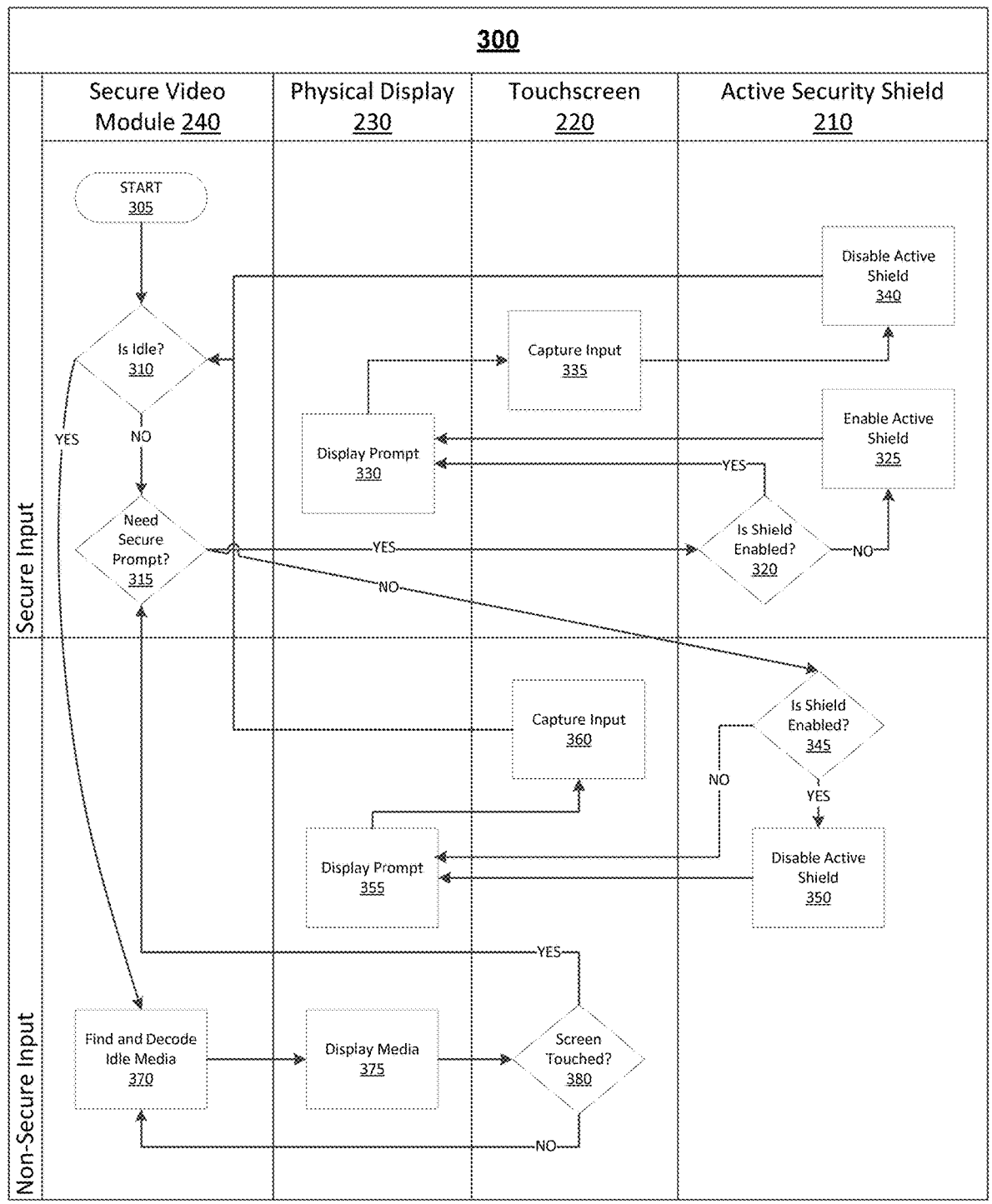
FIG. 3 is a flowchart showing one embodiment of a method for secure touchscreen operation.

FIG. 3 illustrates one embodiment of a method 300 for secure touchscreen operation. The method 300 is described with respect to the terminal 110 of the dispenser 100 of FIG. 1, but the method 300 can be similarly performed using other embodiments of terminals and dispensers described herein. Although specific components of the terminal 110 are illustrated as performing specific functions in a specific order, in other embodiments the order of the functions may change, more or less functions may be performed (e.g., credit card authorization, fuel dispensing control, and/or the like), and/or different components may perform or otherwise aid in the performance of the functions illustrated as being performed by other components. For example, all of the illustrated functions may be performed and/or controlled by the secure video module 240 as opposed to being performed by various ones of the physical display 230, the touchscreen 220, and the active security shield 210, thereby allowing for more centralized control and coordination of functions.

The method 300 starts at start block 305. The method 300 then proceeds to decision block 310, where the secure video module 240, for example, determines whether the terminal 110 is in an idle mode. The terminal 110 being in the idle mode corresponds to a fueling session not being active at the dispenser 100 for which the terminal 110 would be used, e.g., involving fuel that may be or is being dispensed from either of the two nozzles 105 visible in FIG. 1. If the terminal 110 is not in the idle mode, then the method 300 proceeds to decision block 315 where the secure video module 240, for example, determines whether a secure prompt is needed. Determination of whether a secure prompt is needed can be in response to determining that PII is requested/needed from a user (e.g., a customer at the fuel dispenser 100) and/or in response to receiving payment information via a payment card reader (e.g., a user swipes their credit/debit card). If a secure prompt is needed, then method 300 proceeds to decision block 320 where the active security shield 210, for example, determines whether the shield 210 is enabled. If not, then the method 300 proceeds to operational block 325 where the active security shield 210, for example, enables the shield 210 (e.g., the terminal 110 enters the active mode from the inactive mode). Once the shield 210 is enabled at the operational block 325 or if the shield 210 was determined to be enabled at the decision block 320, the method 300 proceeds to operational block 330 where the physical display 230, for example, displays one or more prompts for the user to input information.

After displaying the prompts at the operational block 330, the method 300 proceeds to operational block 335 where the touchscreen 220, for example, captures input. The input can be in any of a variety of forms, as discussed herein, such as one or more of a PIN number for authorizing a debit card transaction, a zip code for authorizing a credit card transaction, and a phone number for accessing rewards programs. After the input is captured, the method 300 proceeds to operational block 340 where the active security shield 210, for example, disables the active shield 210 (e.g., the terminal 110 enters inactive mode from the active mode). After the active shield 210 is disabled, method 300 returns to the decision block 310.

At the decision block 310, if the secure video module 240 determines that the terminal 110 is in the idle mode, then the method 300 proceeds to functional block 370 where the secure video module 240, for example, finds and decodes idle media 370. After the idle media is found/decoded, the method 300 proceeds to operational block 375 where the physical display 230, for example, may display media (e.g., shown idle screen thereon). After the idle media is displayed, the method 300 proceeds to decision block 380 where the touchscreen 220, for example, determines whether the screen 220 was touched. If not, the method 300 returns to the operational block 370 to find and decode new idle media (or the operational block 375 to continue displaying the same idle media), such that media is continually displayed during the idle mode. The same idle media can be configured to be displayed for a predetermined amount of time, e.g., one minute, five minutes, etc., before new idle media is found and decoded, which may help keep the idle media fresh. If the touchscreen 220 instead determines at the decision block 380 that the screen 200 was touched, then the method 300 proceeds to the decision block 315.

At the decision block 315, if the secure video module 240 determines that a secure prompt is not needed, then the method 300 proceeds to decision block 345 where the active security shield 210, for example, determines whether the shield 210 is enabled. If the shield 210 is enabled, then method 300 proceeds to operational block 350 where the active security shield 210, for example, disables the shield 210. Once the shield 210 is disabled at the operational block 350 or after the shield 210 is determined to not be enabled at the decision block 345, the method 300 proceeds to operational block 355. Similar to the operational block 330, at the operational block 355 the physical display 230, for example, displays a prompt, and the method 300 thereafter proceeds to operational block 360 where the touchscreen 220, for example, captures input. Once the input is captured, the method 300 returns to the decision block 310.

The method 300 may thus provide for a terminal 110 which allows for secure input and unencumbered multimedia playback/display.

Figure 4:
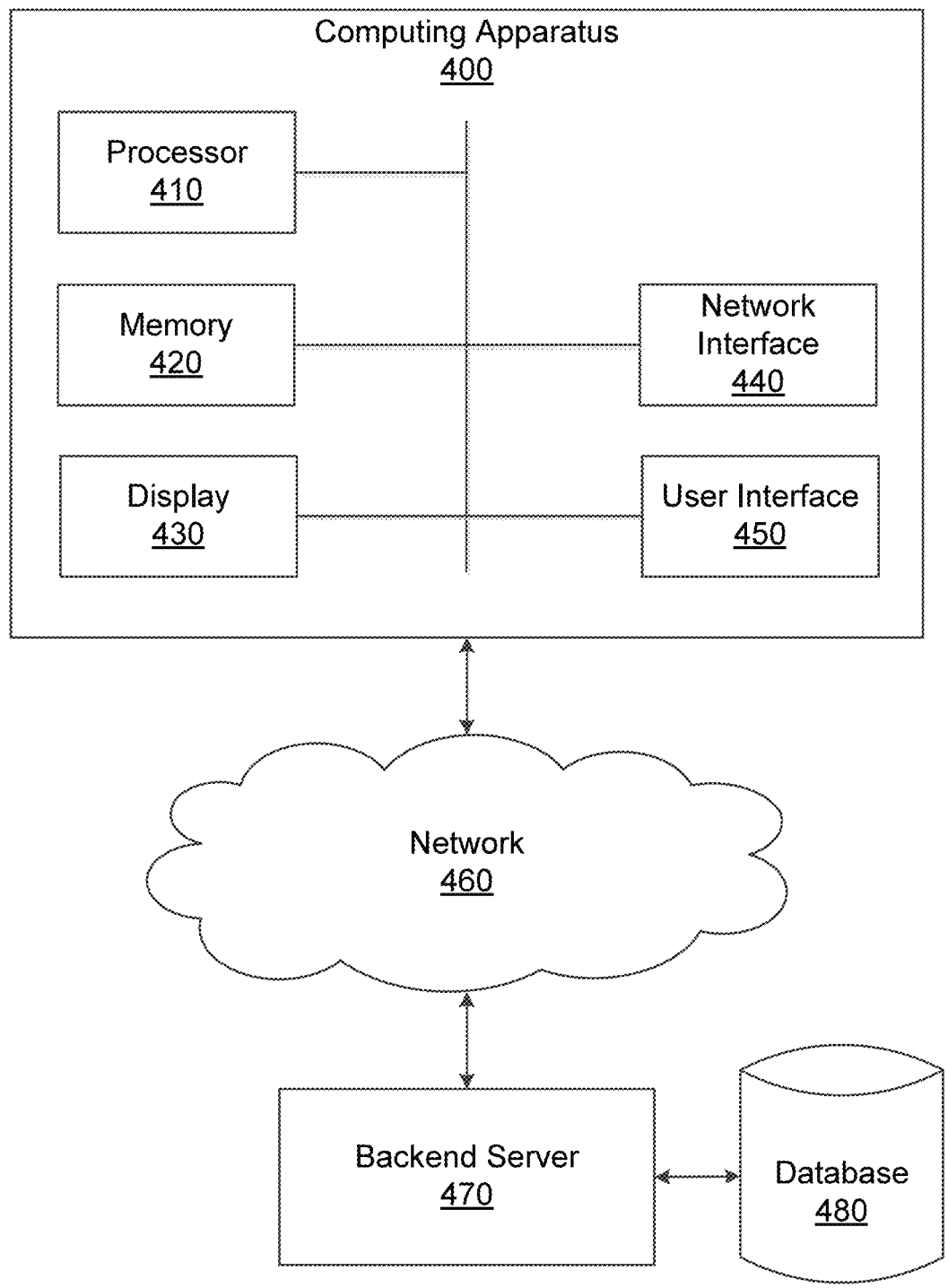
FIG. 4 is a schematic view of one embodiment of a system for processing customer payments and providing multimedia content to a terminal.

FIG. 4 illustrates one embodiment of a system for processing customer payments and providing multimedia content to a terminal of a fuel dispenser or other device. An apparatus consistent with the illustrated computing apparatus 400 can be used to implement a portion of the fuel dispenser 100 and/or the terminal 110. Similarly, the computing apparatus 400 can be configured to perform the processes described herein.

As illustrated, the computing apparatus 400 includes one or more processors 410 configured to execute instructions that implement operations consistent with those described herein. The apparatus 400 includes a memory 420 configured to store executable instructions and/or information. The memory 420 can include solid-state memory, solid-state disk drives, magnetic disk drives, or any other information storage device. The apparatus 400 can include a network interface 440 configured to communicate with a wired network or a wireless network, such as the network 460. Examples of wireless networks include WiFi, WiMax, and cellular networks (2G/3G/4G/5G). The computing apparatus 400 includes one or more user interface 450. The user interface 450 can include hardware or software interfaces, such as a keyboard, mouse, and/or other interface that can include a touchscreen integrated with a display 430.

The user interface 450 can include the touchscreen 220 of FIG. 2A, the processor 410 can include the secure video module 240 of FIG. 2A, and the display 430 can include the physical display 230 of FIG. 2A. The processor 410 can be configured to generate a graphical user interface (GUI) for the display 430. The GUI can be used to request and/or receive PII or other information from a user. The GUI can be viewable from a first view that is substantially in front of the GUI, and the processor 410 can be configured to cause the request to be obscured from a plurality of other views which are not substantially in front of the GUI (e.g., each of the plurality of other views being at an angle, distance, and/or combination of both from the front of the GUI that is greater than a threshold amount). In response to receiving the PII via the GUI, the processor 410 can be configured to cause multimedia content to be displayed on the display 430 that is viewable from the first view and the plurality of other views. The processor 410 can be configured to cause display a request for PII in a plurality of different locations to be shown on the GUI. Displaying the request for PII in the plurality of different locations can include displaying the request in a location that is vertically and/or horizontally offset from a center of the GUI or the display 430.

The computing apparatus 400 is configured to communicate with a backend server 470 via the network 460. The backend server 470 can be configured to access a database 480 configured to store information related to the use of the fuel dispenser 100, information related to the use of the terminal 110, customer information, multimedia, and/or the like. In at least some embodiments, the database 480 can be included as part of the server 470. In at least some embodiments, instead of the apparatus 400 controlling certain operation, the backend server 470 can instead be utilized to, e.g., authorize payment at the fuel dispenser 100, cause media to be played/displayed at the terminal 110, and/or control or aid operation of the terminal 110.

Figure 5:
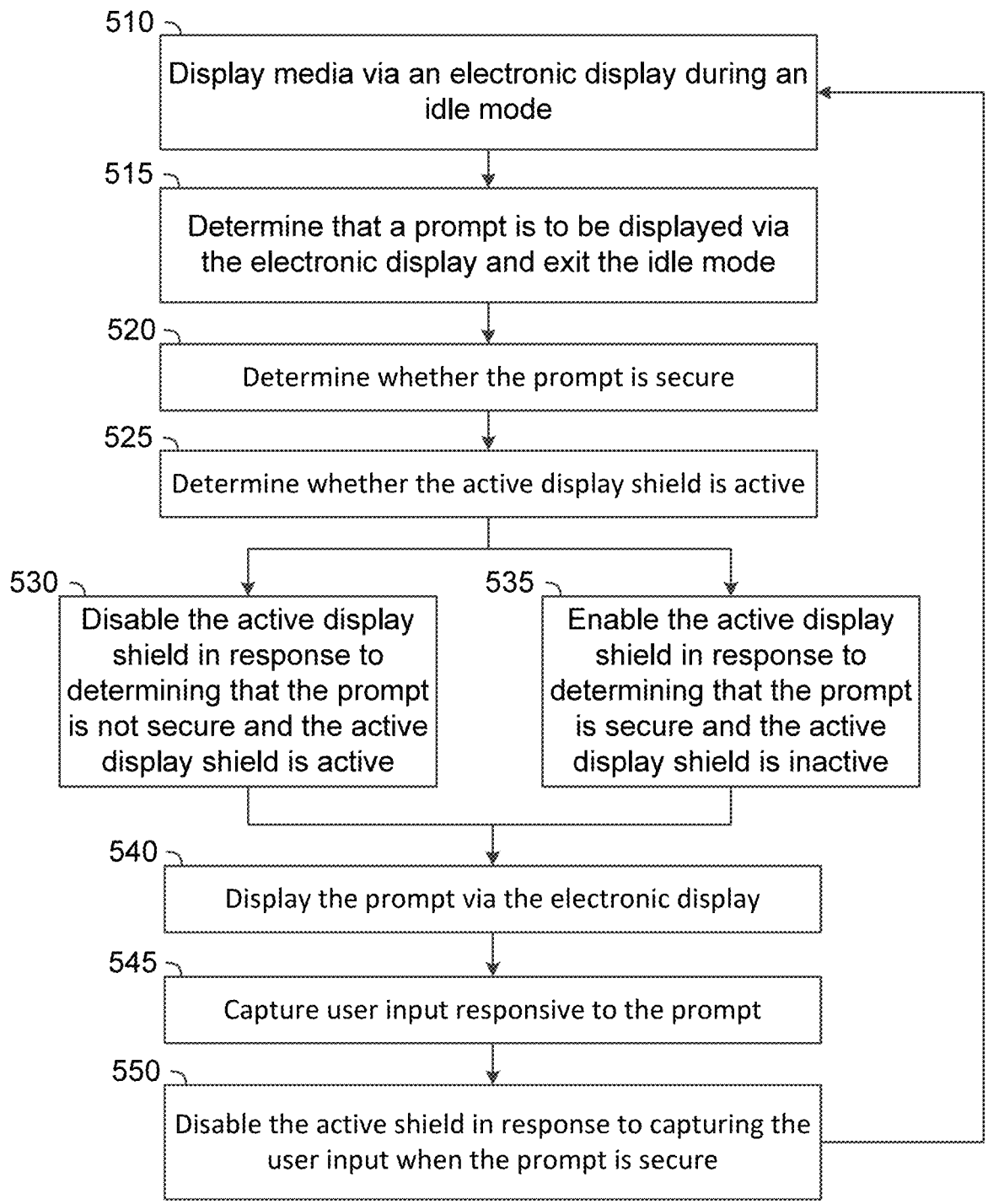
FIG. 5 is a flowchart showing another embodiment of a method for secure touchscreen operation.

FIG. 5 illustrates another embodiment of a method 500 for secure touchscreen operation. The method 500 is described with respect to the system of FIG. 4, but the method 500 can be similarly performed using other embodiments of systems described herein. Although specific operations are illustrated as occurring in a specific order, in other embodiments the order of the operations may change and/or more or less operations may be performed (e.g., credit card authorization, fuel dispensing control, and/or the like).

In order to implement the method 500, the computing apparatus 400 can include an active display shield configured to obscure content shown on the display 430 from a plurality of views which are not substantially in front of the display 430, and the processor 410 can be operably coupled to the active display shield. The method 500 starts at operational block 510 where the processor 410 of the computing apparatus 400, for example, causes media to be displayed via the display 430 during an idle mode of the apparatus 400.

The method 500 proceeds to operational block 515 where the processor 410 of the computing apparatus 400, for example, determines that a prompt is to be displayed via the electronic display 430 and cause exit from the idle mode. Determining that a prompt is to be displayed can include determining whether a user touch (e.g., via a touchscreen) or payment information has been received.

The method 500 proceeds to operational block 520 where the processor 410 of the computing apparatus 400, for example, determines whether the prompt is secure. Determining whether the prompt is secure can include determining whether the prompt requests PII. The method 500 then proceeds to operational block 525 where the processor 410 of the computing apparatus 400, for example, determines whether the active display shield is active (e.g., the terminal of the apparatus 400 is in an active mode).

The method 500 next proceeds to operational block 530 where the processor 410 of the computing apparatus 400, for example, causes the active display shield to be disabled in response to determining that the prompt is not secure and that the active display shield is active. Additionally or alternatively to proceeding to the operational block 530, the method 500 can proceed from the operational block 525 to operational block 535 where the processor 410 of the computing apparatus 400, for example, causes the active display shield to be enabled in response to determining that the prompt is secure and that the active display shield is inactive.

From each of the operational blocks 530 or 335, the method 500 proceeds to operational block 540 where the processor 410 of the computing apparatus 400, for example, causes the prompt to be displayed via the electronic display 430.

The method 500 then proceeds to operational block 545 where the processor 410 of the computing apparatus 400, for example, captures user input responsive to the prompt. The method 500 thereafter proceeds to operational block 550 where the processor 410 of the computing apparatus 400, for example, causes the active shield to be disabled in response to capturing the user input when the prompt is secure. After the operational block 550, the method 500 returns to the operational block 510.

The method 500 may therefore allow for a display which allows for secure input and unencumbered multimedia playback, and/or may allow for increased security due to the increased difficulty of obtaining PII from a customer at an apparatus such as the apparatus 400 or the fuel dispenser 100.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The media management described above is discussed with respect to media management for fuel dispensers, but, as mentioned above, media can be similarly managed for other types of devices configured to output media to customers or potential customers. For example, a media management system for one or more taxis that include a media output device (e.g., a display screen in a back seat of the taxi, etc.) can include a media library configured to provide the one or more taxis with new and updated media content based on a unique identification of the taxi or a group of taxis (e.g., a group of commonly-owned taxis, a group of taxis in a same geographic area such as in a same city or in a same zip code, etc.). Riders of the taxi(s) may thus receive more timely and/or more relevant media content during their rides.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A method, comprising:
   displaying unsecure information on a terminal in a first mode in which a security shield of the terminal is inactive;
   after displaying the unsecure information in the first mode, displaying on the terminal a request for input of secure information to identify a customer;
   wherein the terminal displays the request in a second mode in which the security shield is active and obscures a view of the request; and
   wherein the terminal automatically moves from the first mode to second mode in response to the request being displayed.

2. The method of claim 1, wherein the secure information includes a personal identification number (PIN).

3. The method of claim 1, wherein the secure information includes a fingerprint.

4. The method of claim 1, wherein the secure information includes a biometric input including at least one of an eye pattern, a palm print, DNA, hand geometry, and a vein pattern.

5. The method of claim 1, wherein the security shield includes a filter; and
   moving from the first mode to the second mode comprises electrically modifying a material of the filter.

6. The method of claim 1, further comprising receiving the input of secure information;
   wherein the terminal automatically moves from the second mode to first mode in response to the receipt of the input of secure information.

7. The method of claim 1, wherein, in the second mode, the security shield obscures the view of the request from a plurality of angles; and
   in the first mode, the security shield does not obscure a view of the unsecure information from any of the plurality of angles.

8. The method of claim 1, wherein, in the second mode, the security shield obscures the view of the request from a distance that is greater than a predetermined distance; and
   in the first mode, the security shield does not obscure a view of the unsecure information from the distance that is greater than the predetermined distance.

9. The method of claim 1, wherein the terminal includes one of a fuel dispenser, a vending machine, a parking payment device, and a transportation service vehicle.

10. The method of claim 9, wherein a processor of the terminal causes the terminal to display the unsecure information, causes the terminal to display the request, and causes the automatic movement;
    the unsecure information is shown on a display screen of the terminal; and
    the request is shown on the display screen of the terminal.

11. A device, comprising:
    a terminal configured to receive input of secure information and to display multimedia, the terminal comprising
    a screen configured to show a request for input of the secure information to identify a customer and configured to show the multimedia,
    a security shield operatively coupled to the screen, and
    a processor configured to automatically move the terminal from a first mode, in which the security shield is inactive, to a second mode, in which the security shield is active and obscures a view of the request, in response to the request being shown on the screen;
    wherein the multimedia is shown with the terminal in the first mode, and the request is shown with the terminal in the second mode.

12. The device of claim 11, wherein the secure information includes at least one of a personal identification number (PIN) and a fingerprint.

13. The device of claim 11, wherein the secure information includes a biometric input including at least one of an eye pattern, a palm print, DNA, hand geometry, and a vein pattern.

14. The device of claim 11, wherein the security shield includes a filter; and
moving from the first mode to the second mode comprises electrically modifying a material of the filter.

15. The device of claim 11, wherein the processor is configured to cause the terminal to automatically move from the second mode to first mode in response to the receipt of the input of secure information.

16. The device of claim 11, wherein the terminal includes one of a fuel dispenser, a vending machine, a parking payment device, and a transportation service vehicle.

17. A device, comprising:
a terminal configured to display multimedia and to receive input of secure information to identify a customer, the terminal comprising
a security shield, and
a screen operatively coupled to the security shield, configured to show a request for input of the secure information with the security shield in a first state in which the security shield obscures a view of the request, and configured to show the multimedia with the security shield in a second state in which the security shield is not obscuring a view of the multimedia;
wherein the terminal includes one of a fuel dispenser, a vending machine, a parking payment device, and a transportation service vehicle.

18. The device of claim 17, wherein the security shield is configured to move between the first state and the second state by electrically modifying a material of the security shield.

19. The device of claim 17, wherein the security shield obscures the view of the request for a first user a beyond a predetermined distance away from the screen while allowing a second user less than the predetermined distance away from the screen to view the request.

20. The device of claim 17, wherein the security shield obscures the view of the request for a first user viewing the screen from any angle within a first range of angles while allowing a second user to view the request from any angle within a second, different range of angles.

21. The device of claim 17, wherein the secure information includes at least one of a personal identification number (PIN) and a fingerprint.

22. The device of claim 17, wherein the secure information includes a biometric input including at least one of an eye pattern, a palm print, DNA, hand geometry, and a vein pattern.

* * * * *